Patented Sept. 28, 1926.

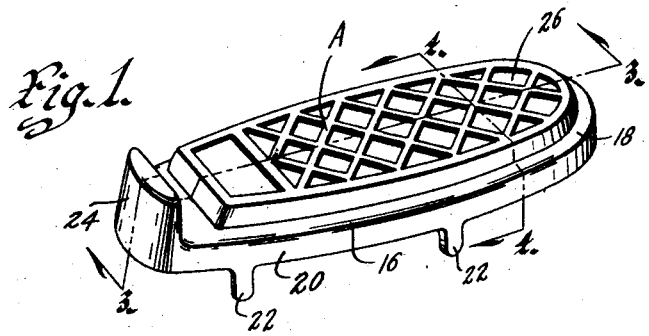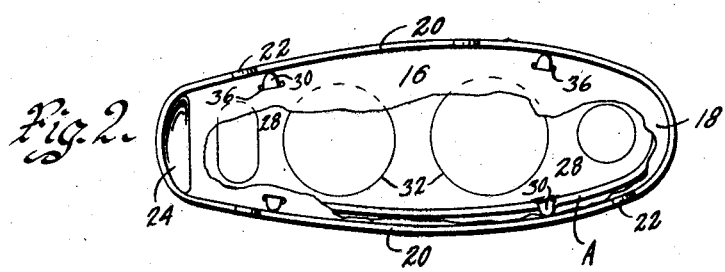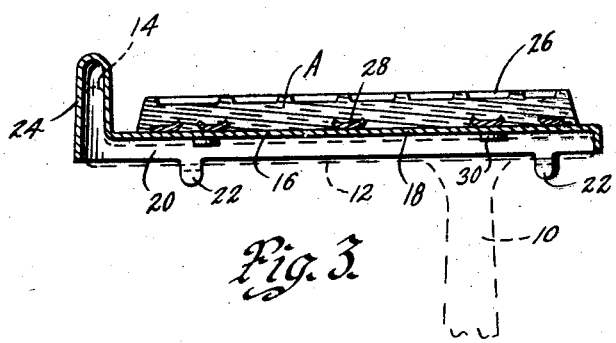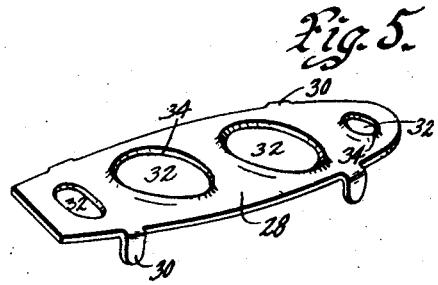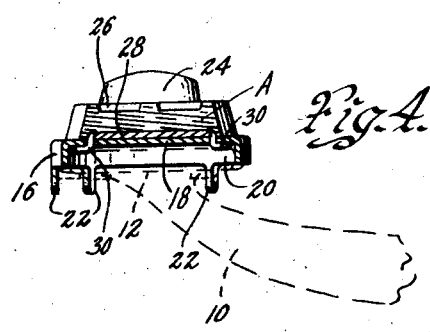

1,601,708

UNITED STATES PATENT OFFICE.

WALTER H. THOMAS, OF SPENCER, IOWA.

PEDAL PAD.

Application filed July 21, 1926. Serial No. 123,975.

The object of my invention is to provide a pedal pad of simple, durable and comparatively inexpensive construction.

More particularly it is my object to provide a pedal pad having a housing at one end thereof adapted to receive and enclose the foot stop normally provided upon foot pedals of automobiles.

Still a further object is to provide a metallic engaging and pad holding frame having at one end an upwardly extending hollow projection for enclosing and receiving the foot stop of a brake or clutch pedal of an automobile for providing a foot stop when the pedal pad is mounted upon the foot pedal.

It may be here mentioned that rubber pedal pads are quite desirable for use upon automobile brake and clutch foot pedals, although when such pedal pads are mounted upon the foot pedal it usually extends upwardly a sufficient distance so that the benefit of the stop upon the foot pedal is lost and it is my object to provide a metal foot stop forming a part of the pedal pad itself whereby the rubber foot pedal has its upper surface below the upper end of the metal stop which forms a part of the base of the pedal pad.

Still a further object is to provide a rubber pad or foot engaging pad of substantially the same size and shape as the foot pedal itself and which when cast or vulcanized may be flat upon both its top and bottom sides.

Still a further object is to provide metal fastenings embedded within the rubber pad during the vulcanizing thereof having fastening elements thereon adapted to coact with slots formed in the metal base of the pedal pad for anchoring the rubber pad upon such base.

With these and other objects in view, my invention consists in the construction, arrangement and combination of the various parts of my foot pedal pad, whereby the objects contemplated are attained, as hereinafter more fully set forth, pointed out in my claims, and illustrated in the accompanying drawings, in which:—

Figure 1 is a perspective view of my improved pedal pad illustrating the metal stop projecting up above the upper surface of the rubber pad.

Figure 2 is a view of the side of the pedal pad, parts of the metal base being broken away to better illustrate the construction.

Figure 3 is a sectional view taken on line 3—3 of Figure 1, illustrating the pedal pad as installed upon a foot pedal.

Figure 4 is a sectional view taken on line 4—4 of Figure 1, and

Figure 5 is a detail perspective view of the metal plate which is embedded in the rubber pad and has fastening elements thereon for securing the rubber pad to the base.

In the accompanying drawings I have used the reference numeral 10 to indicate the shank of a brake or clutch foot pedal and 12 to indicate the head or foot engaging piece of the foot pedal.

The foot engaging piece 12 is formed with an upwardly extending foot stop 14. The foot stop 14 serves as a finder for locating the pedal and at the same time prevents the foot from slipping sidewise therefrom.

The foot stop 14 is quite a desirable thing upon a foot pedal. My foot pedal pad comprises a metal pedal engaging and pad holding base or frame 16. The base 16 is formed of sheet metal and formed up by stampings.

The base 16 includes a flat supporting surface 18 adapted to rest upon the foot piece 12 of the foot pedal 10. The general outline of the base 16 is substantially the same as the foot piece 12 itself.

The base 16 includes a downwardly extending peripheral flange 20 which tends to reinforce the base 16 and at the same time serves as a casing for the outer edge of the foot piece 12. In order to secure the base 16 to the foot piece 12 I provide a number of downwardly extending fastening lugs 22.

The fastening lugs 22 are bendable and formed integral with the base 16. The fastening lugs 22 may be bent inwardly and in engagement with the under surface or side of the foot piece 12. The flange 20 prevents any sideward movement of the base 16 relative to the foot piece 12 and the lugs 22 hold the base in proper position on the foot piece 12. Formed integral with the base 16 and projecting upwardly therefrom a considerable distance is a housing 24.

The housing 24 is closed on three sides and open on its bottom side. The housing 24 receives the foot stop 14 of the foot pedal 10 as clearly illustrated in Figure 3 of the drawings.

The lower edge of the housing 24 is in alignment with the lower edge of the flange 20 and makes a very neat appearing structure. The housing 24 is formed by die stampings.

Upon the upper surface 18 of the base 16 is mounted a rubber pad A. The pad A is of substantially the same size and shape as the foot piece 12 and has its upper and lower surfaces flat which are desirable from a vulcanizing and manufacturing standpoint.

The rubber pad A is formed with a cross ribbed and grooved foot engaging surface 26 as clearly illustrated in Figure 1 of the drawings. This adds to the beauty of the rubber pad and at the same time is very practical.

In order to anchor the rubber pad A to the base 16 I provide a metal plate 28 having a number of downwardly projecting lugs 30. The plate 28 is formed with a number of openings 32 having the material adjacent the edges, upstruck as at 34 for insuring proper anchorage of the metal plate 28 in the rubber pad A when the pad A is cast and vulcanized.

The plate 28 practically serves as the bottom surface of the rubber pad A and the upstruck edges 34 serve as the means for insuring proper connection between the plate 28 and the rubber pad A.

The upper surface 18 of the base 16 is formed with a number of slots 36 which are designed to receive the lugs 30 of the plate 28. The lugs 30 after being extended through the slots 36 are bent over for securely anchoring the rubber pad A upon the base 16.

The upper surface of the pad A is a sufficient distance below the upper end of the housing 24 so that the housing 24 forms a foot stop for the rubber pad the same as the stop 14 serves as a foot stop for the foot piece 12.

It will be noted that the housing 24 is formed integral with the base 16 and made of metal and that the rubber pad A is mounted upon the flat upper surface of the base 16. The rubber pad A does not in any way affect the foot piece formed by the housing 24 from functioning properly.

By encasing the foot stop 14 of the foot piece 12, I am able to make a much neater appearing pedal pad and at the same time extend the housing 24 upwardly a sufficient distance so as to serve as a real foot stop for the rubber pad A.

Some changes may be made in the details of construction and arrangement of my pedal pad structure without departing from the real invention involved therein, and it is my intention to cover by my claims any modified forms of structure or use of mechanical equivalents, which may be reasonably included within the scope of such claims.

I claim as my invention:—

1. In combination with a foot pedal having a foot stop at one end, of a pedal pad comprising a metallic pedal-engaging and pad-holding base, an upwardly projecting housing on said base and integral therewith for receiving the foot stop and thereby forming a foot stop for the pedal pad, and a rubber pad mounted upon said base.

2. In combination with a foot pedal having a foot stoop at one end, of a pedal pad comprising a metallic pedal-engaging and pad-holding base, an upwardly projecting housing on said base and integral therewith for receiving the foot stop, a rubber pad, fastening elements anchored in said rubber pad during the vulcanizing thereof, and means for anchoring said fastening elements to said base for holding said rubber pad upon the base, and means for fastening said base to a foot pedal.

3. In combination with a foot pedal having a foot stop at one end, of a pedal pad comprising a metallic pedal-engaging and pad-holding base, an upwardly projecting housing on said base and integral therewith for receiving the foot stop and thereby forming a foot stop for the pedal pad, and a rubber pad mounted upon said base, said housing projecting up above the top surafce of said rubber pad.

Des Moines, Iowa, July 16, 1926.

WALTER H. THOMAS.